US012523951B2

(12) United States Patent
Tatezawa et al.

(10) Patent No.: US 12,523,951 B2
(45) Date of Patent: Jan. 13, 2026

(54) IMAGE FORMING APPARATUS WHICH PREVENTS DAMAGE TO SHEET DETECTION FLAG

(71) Applicant: CANON KABUSHIKI KAISHA, Tokyo (JP)

(72) Inventors: Hidekazu Tatezawa, Saitama (JP); Rikiya Takemasa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/484,255

(22) Filed: Oct. 10, 2023

(65) Prior Publication Data

US 2024/0142906 A1 May 2, 2024

(30) Foreign Application Priority Data

Oct. 31, 2022 (JP) ................................ 2022-174159
Jul. 31, 2023 (JP) ................................ 2023-124693

(51) Int. Cl.
*G03G 15/20* (2006.01)
*G03G 15/00* (2006.01)
*G03G 21/16* (2006.01)

(52) U.S. Cl.
CPC ..... *G03G 15/2053* (2013.01); *G03G 15/2028* (2013.01); *G03G 15/2035* (2013.01); *G03G 15/65* (2013.01); *G03G 15/70* (2013.01); *G03G 21/1638* (2013.01); *G03G 15/657* (2013.01); *G03G 21/1685* (2013.01); *G03G 2215/00544* (2013.01); *G03G 2215/00548* (2013.01);

(Continued)

(58) Field of Classification Search
CPC ............... G03G 15/2053; G03G 15/65; G03G 2215/00721; G03G 2215/2038; G03G 15/70; G03G 2221/1675; G03G 15/2035; G03G 21/1638; G03G 2215/00544; G03G 2215/00548; G03G 15/2028; G03G 15/657; G03G 21/1685; G03G 2215/00413; G03G 2215/00628
See application file for complete search history.

(56) References Cited

U.S. PATENT DOCUMENTS 10,877,414 B2 12/2020 Takemasa
11,092,917 B2 8/2021 Tsuno et al.
(Continued)

FOREIGN PATENT DOCUMENTS

JP 2007-248790 9/2007

*Primary Examiner* — Stephanie E Bloss
*Assistant Examiner* — Laura Roth
(74) *Attorney, Agent, or Firm* — Venable LLP

(57) ABSTRACT

An image forming apparatus includes an image forming portion, a fixing device detachably mounted on a main assembly of the image forming apparatus and a moving mechanism. The fixing device includes a detecting flag contacting a back surface of the recording material. The detecting flag is positioned in a first position within a conveyance path when the recording material does not exist on the detecting flag and moves in a direction toward the back surface from a front surface relative to the first position when the recording material exists on the detecting flag. The moving mechanism causes the detecting flag to move so as to position the detecting flag in the first position when the fixing device is mounted on the main assembly and in a retracted position when the fixing device is demounted from the main assembly.

12 Claims, 10 Drawing Sheets

(52) U.S. Cl.
CPC ............. *G03G 2215/00628* (2013.01); *G03G 2215/00721* (2013.01); *G03G 2215/2038* (2013.01)

(56) References Cited

U.S. PATENT DOCUMENTS

| | | | | |
|---|---|---|---|---|
| 11,194,275 | B2 | 12/2021 | Takemasa et al. | |
| 11,269,272 | B2 | 3/2022 | Tatezawa et al. | |
| 11,287,766 | B2 | 3/2022 | Tatezawa et al. | |
| 11,300,906 | B2 | 4/2022 | Takemasa et al. | |
| 11,454,908 | B2 | 9/2022 | Kozuma et al. | |
| 11,567,436 | B2 | 1/2023 | Chikugo et al. | |
| 11,809,109 | B2 | 11/2023 | Takemasa et al. | |
| 2005/0073393 | A1 * | 4/2005 | Motosugi | G03G 15/55 358/1.15 |
| 2007/0126174 | A1 * | 6/2007 | Kayama | B65H 31/02 271/215 |
| 2007/0217839 | A1 | 9/2007 | Moteki et al. | 399/329 |
| 2009/0162121 | A1 * | 6/2009 | Kitan | G03G 15/657 399/400 |
| 2022/0017317 | A1 | 1/2022 | Tatezawa et al. | |

* cited by examiner

IMAGE FORMING APPARATUS WHICH PREVENTS DAMAGE TO SHEET DETECTION FLAG

FIELD OF THE INVENTION AND RELATED ART

This invention relates to an image forming apparatus such as a printer, a copier, a facsimile or a multifunctional machine.

The image forming apparatus is provided with a fixing device for fixing a toner image to a recording material. The fixing device includes a fixing rotatable member and a pressing rotatable member which is in contact with an outer peripheral surface of the fixing rotatable member, and forms a fixing nip portion which nips and conveys the recording material between the fixing rotatable member and the pressing rotatable member to fix the toner image on the recording material by applying heat and pressure to the recording material passing through the fixing nip portion. The fixing device is also provided with a conveyance guide member for guiding the recording material to the fixing nip portion and a sheet presence/absence detecting unit for detecting whether or not the recording material is retained in the fixing device (Japanese Patent Application Laid-Open No. 2007-248790).

The sheet presence/absence detecting unit includes a detecting lever which is movable between a detecting position for detecting a presence or an absence of the recording material by protruding from a recording material conveyance surface of the conveyance guide member and a retracted position for not detecting the presence or the absence of the recording material without protruding from the recording material conveyance surface of the conveyance guide member. In a case of an apparatus disclosed in Japanese Patent Application Laid-Open No. 2007-248790, the detecting lever is moved to the detecting position or the retracted position according to a contact/separation of a pressing unit. That is, the detecting lever is in the detecting position in a separated state in which the pressing rotatable member and the fixing rotatable member do not form the fixing nip portion, and is in the retracted position in a contact state in which the pressing rotatable member and the fixing rotatable member form the fixing nip portion. The sheet presence/absence detecting unit detects the retaining of the recording material by the detecting lever in the detecting position being pressed by the recording material.

When the pressing rotatable member and the fixing rotatable member are in the separated state, a user can remove a retained recording material from the fixing device or perform maintenance of the fixing device. Conventionally, the detecting lever is moved to the detecting position when the pressing rotatable member and the fixing rotatable member are in the separated state. In this case, the detecting lever may get in a way when the user attempts to remove the recording material or to perform maintenance, and the detecting lever may be damaged by the user catching the recording material on the detecting lever or placing a hand on the detecting lever, etc.

In view of the above problem, the present invention aims to provide an image forming apparatus which is capable of causing the detecting lever to move to the detecting position and the retracted position when the pressing rotatable member and the fixing rotatable member are in the separated state in order to prevent damage to the detecting lever.

SUMMARY OF THE INVENTION

According to an aspect of the present invention, there is provided an image forming apparatus comprising: an image forming portion configured to form a toner image on a recording material; a fixing device detachably mounted on a main assembly of the image forming apparatus and configured to fix the toner image formed on the recording material by the image forming portion; wherein the fixing device includes a detecting unit disposed upstream of the fixing device with respect to a conveyance direction of the recording material and configured to detect the recording material, wherein when a surface of the recording material on which the toner image is formed by the image forming apparatus is defined as a front surface and a surface opposite to the front surface is defined as a back surface, the detecting unit includes a detecting flag contacting the back surface of the recording material, wherein the detecting flag is positioned in a first position within a conveyance path from the image forming apparatus to the fixing device in a case in which the recording material does not exist on the detecting flag, and wherein the detecting flag moves in a direction toward the back surface from the front surface relative to the first position in a case in which the recording material exists on the detecting flag; and a moving mechanism configured to cause the detecting flag to move, wherein the moving mechanism causes the detecting flag to move so as to position the detecting flag in the first position in a state in which the fixing device is mounted on the main assembly of the image forming apparatus, and wherein the moving mechanism causes the detecting flag to move so as to position the detecting flag in a retracted position moved in the direction toward the back surface from the front surface relative to the first position in a state in which the fixing device is demounted from the main assembly of the image forming apparatus.

Further features of the present invention will become apparent from the following description of exemplary embodiments with reference to the attached drawings.

Figure 4:
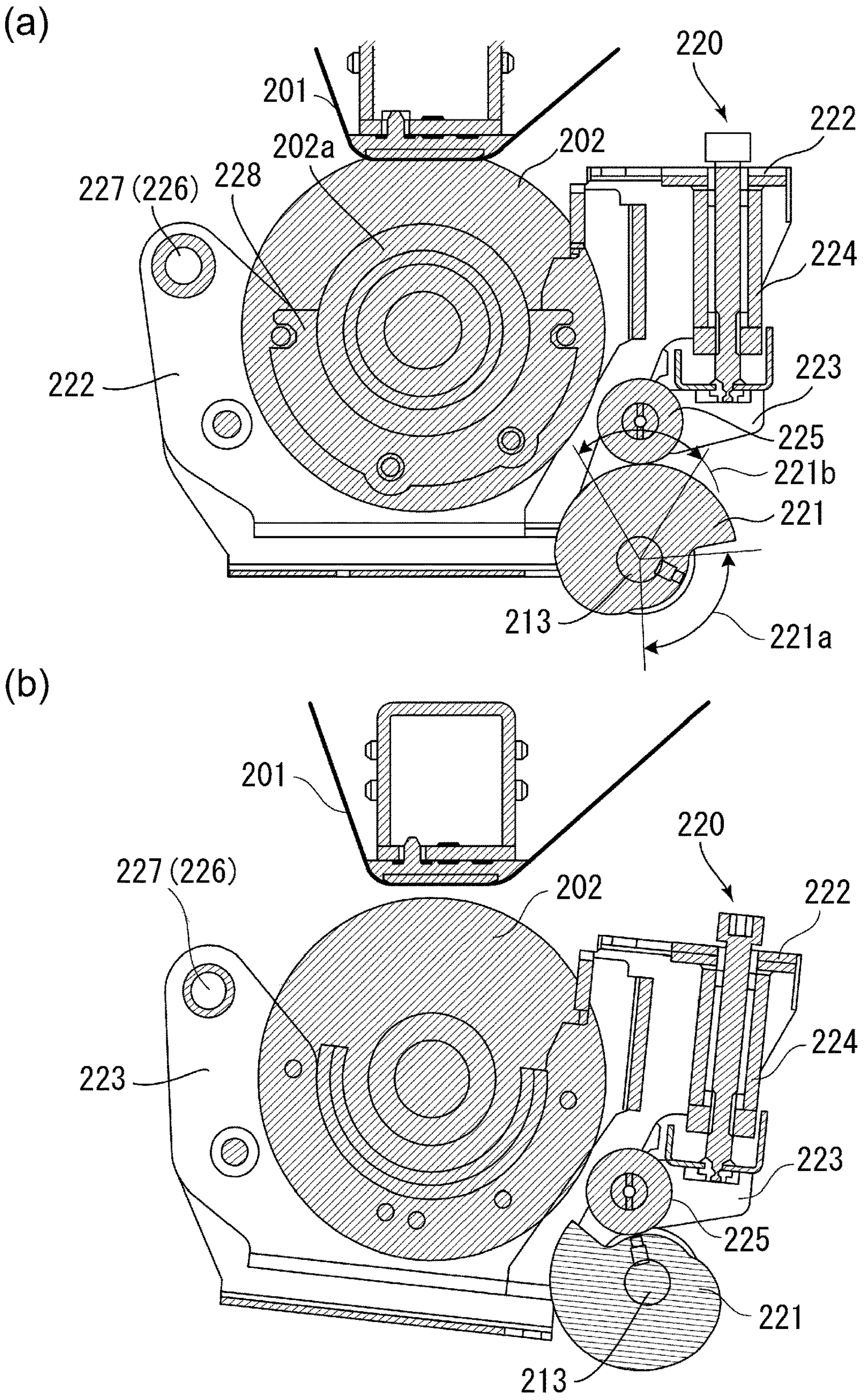

Part (a) of FIG. 4 is a cross-sectional view illustrating a case in which a pressing roller is in a contact position, and part (b) of FIG. 4 is a cross-sectional view illustrating a case in which the pressure roller is in a separated position.

Figure 5:
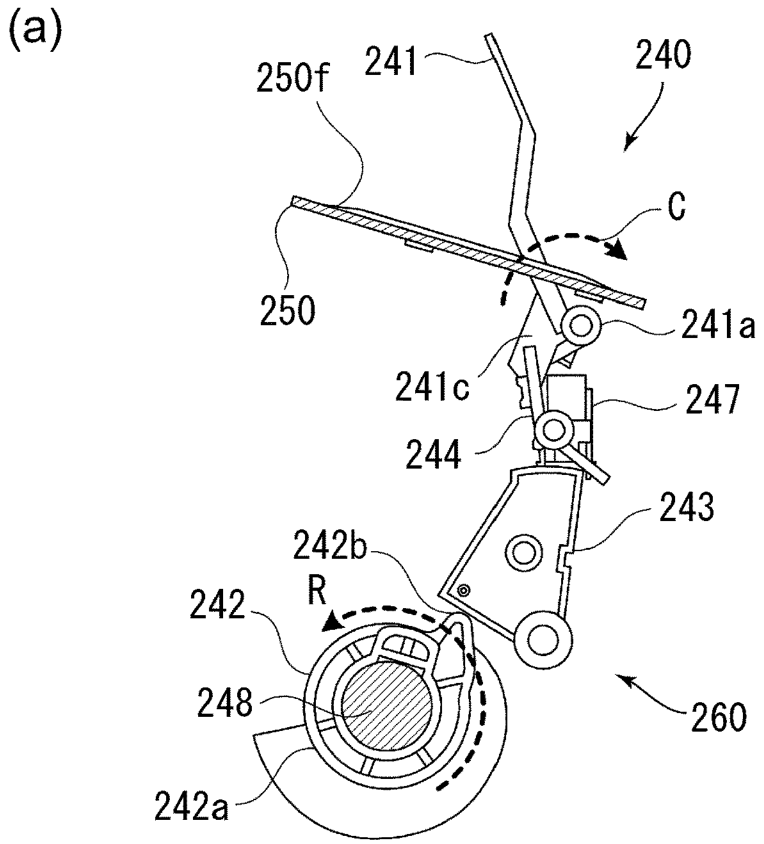
Figure 5:
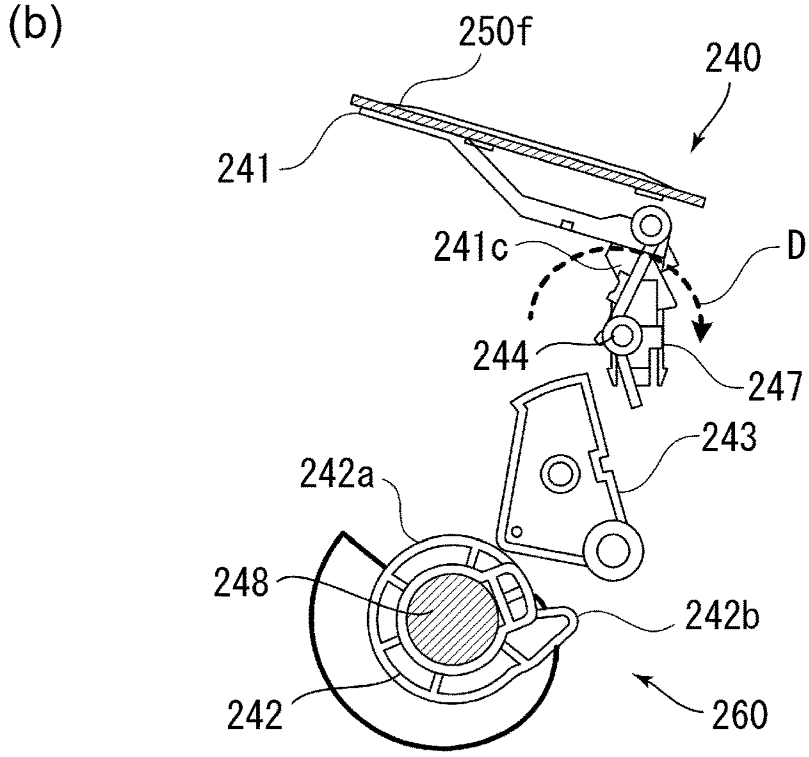

FIG. 5, part (a) and part (b), is a schematic view illustrating a detecting unit, and part (a) of FIG. 5 illustrates a case in which a detecting lever is in a detecting position and part (b) of FIG. 5 illustrates a case in which the detecting lever is in a retracted position.

Figure 6:
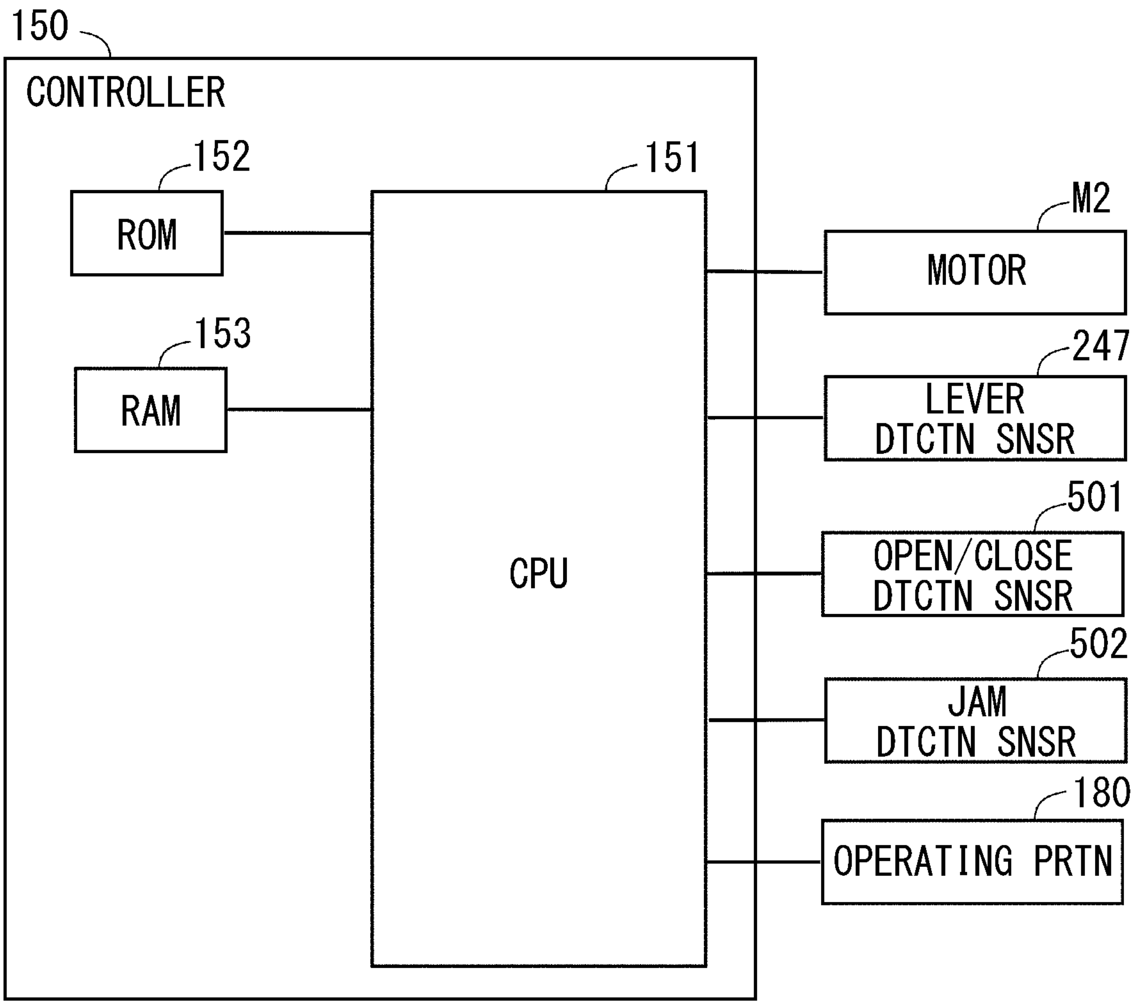

FIG. 6 is a control block diagram illustrating a control system with regard to a removal of a fixing jam.

Figure 7:
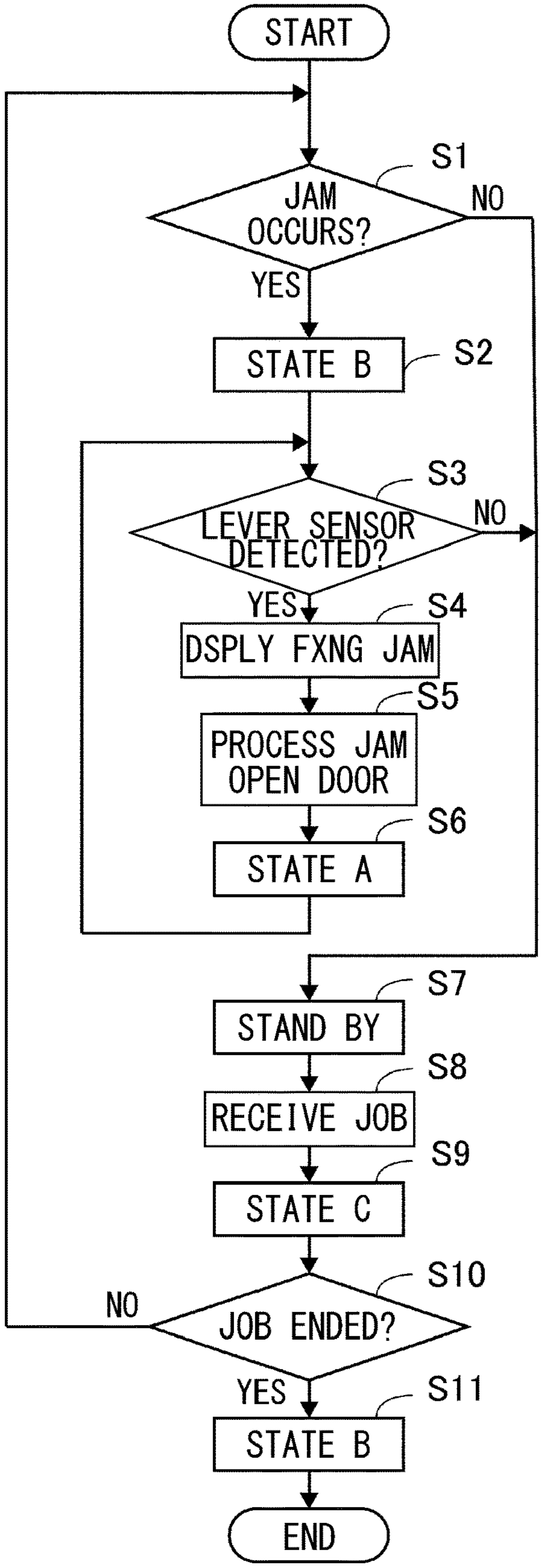

FIG. 7 is a flowchart illustrating a detecting lever control process.

Figure 8:
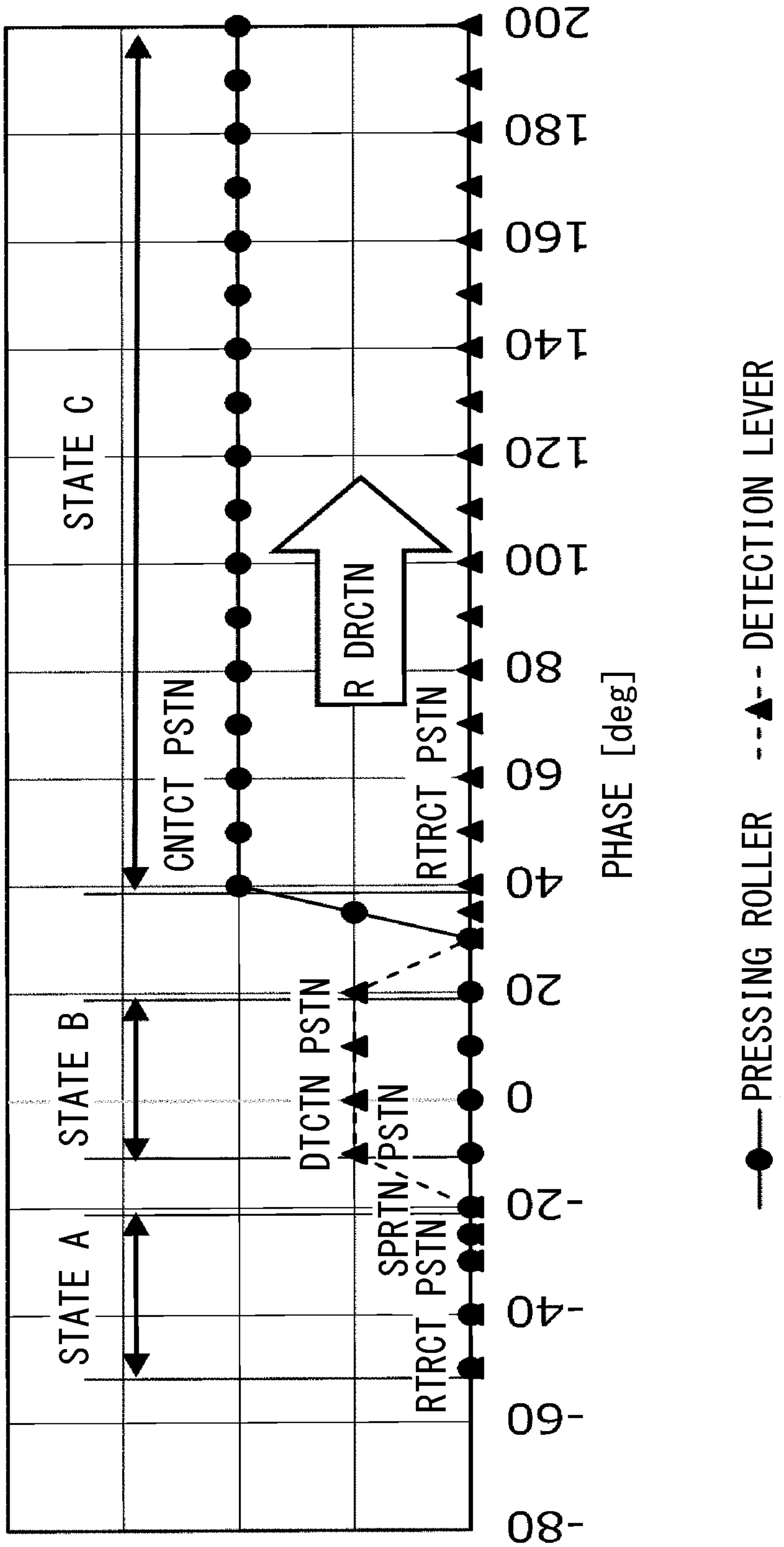

FIG. 8 is a graph illustrating a position of the pressing roller and a position of the detecting lever according to a phase of a rotational shaft.

Figure 9:
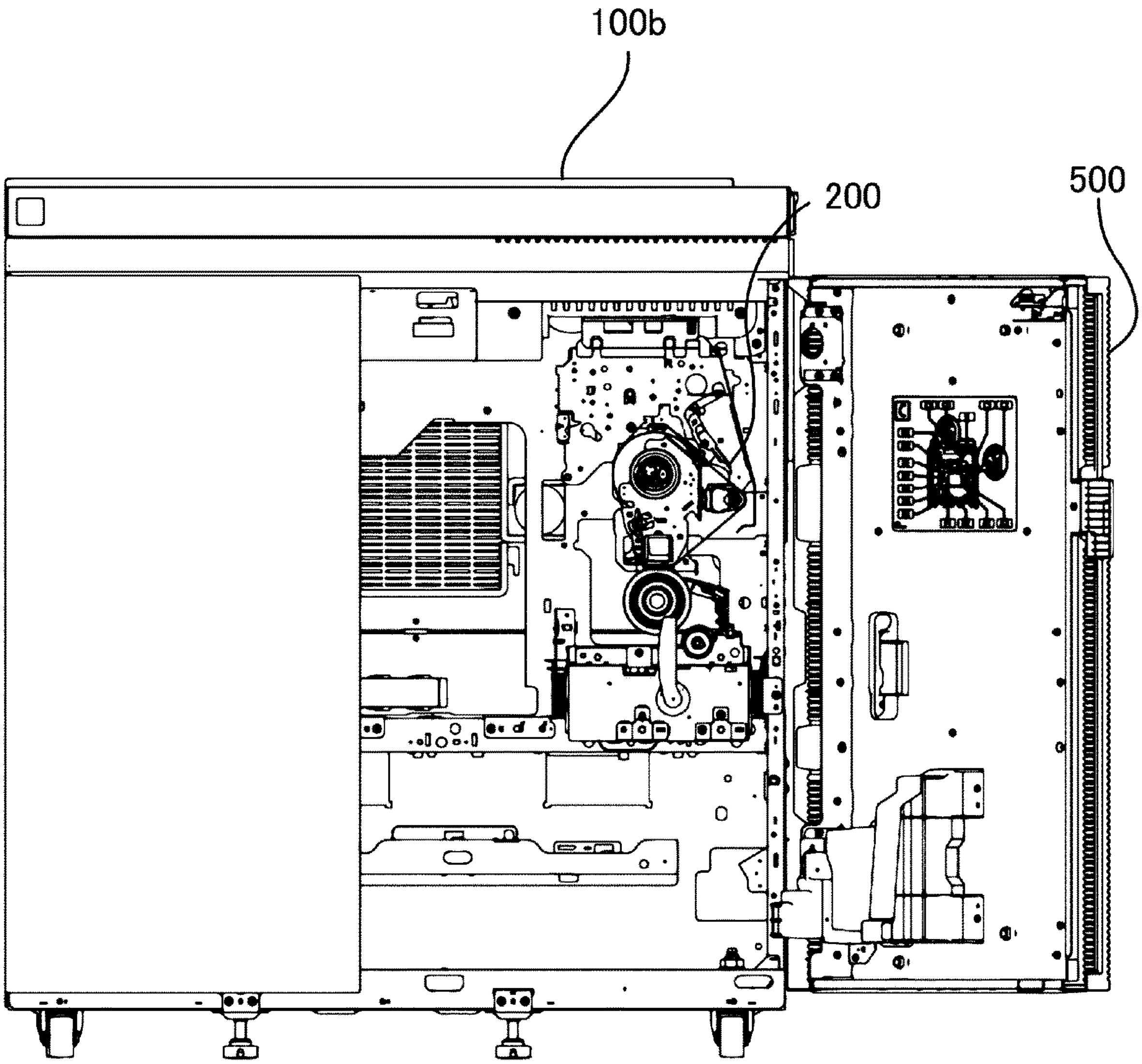

FIG. 9 is a view illustrating the imaging forming apparatus when an opening/closing door is in an open state.

Figure 10:
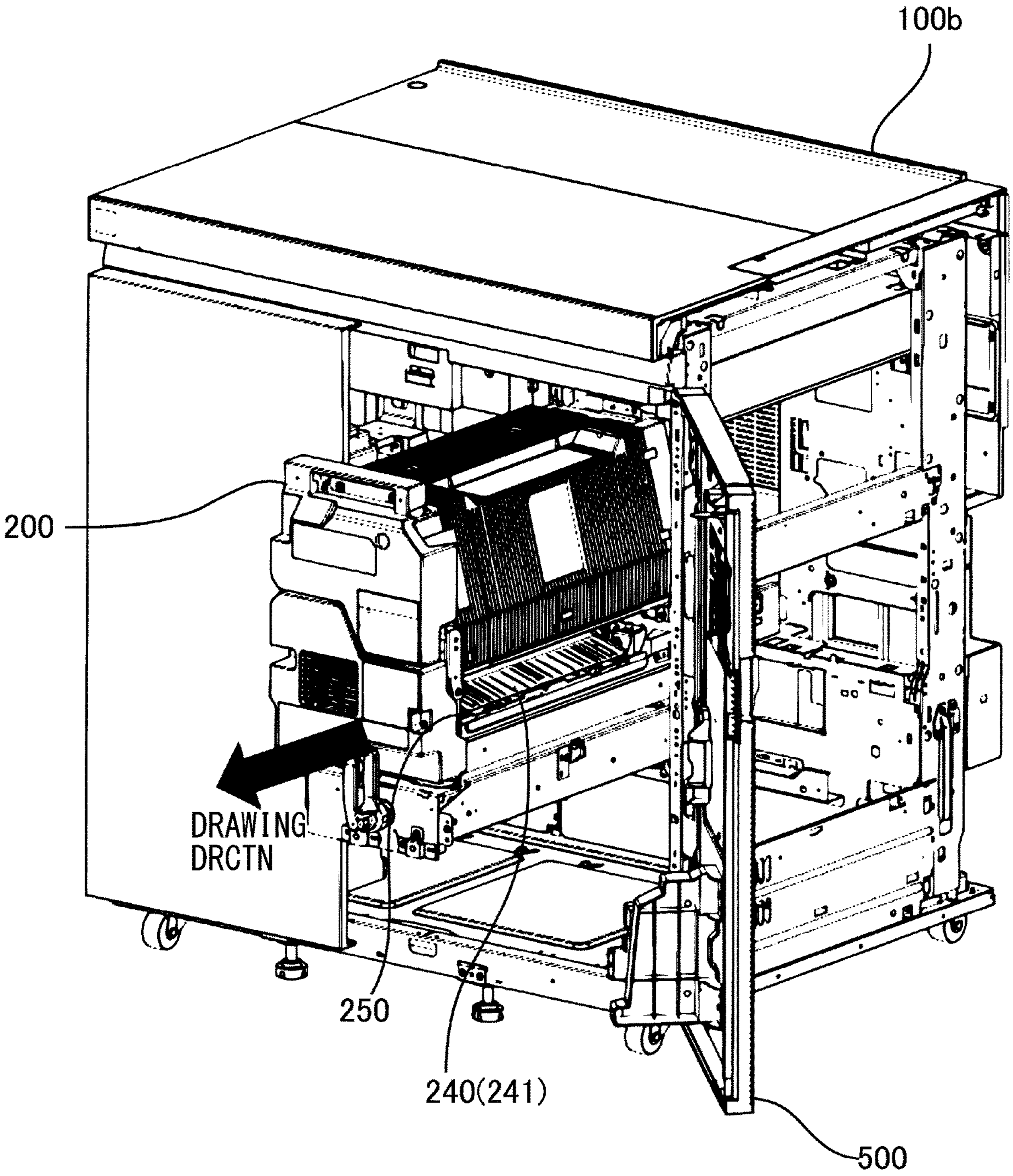

FIG. 10 is a view when a fixing device is drawn out with the opening/closing door being in the open state.

DESCRIPTION OF THE EMBODIMENTS

In the following, embodiments of the present invention will be specifically described with reference to Figures.

<Image Forming Apparatus>

Figure 1:
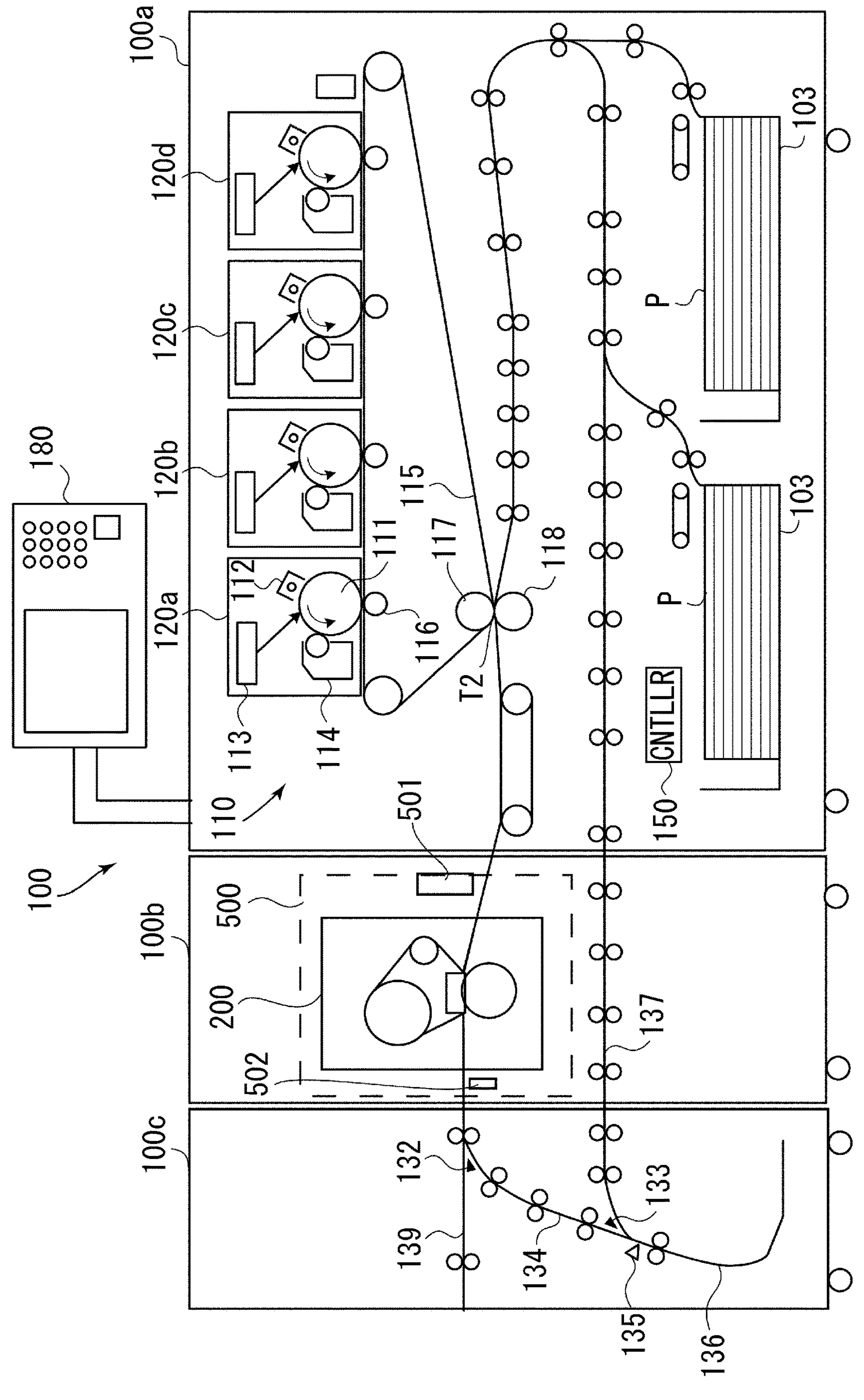
FIG. 1 is a schematic view illustrating an image forming apparatus of an Embodiment 1.

An Embodiment 1 will be described. First, an overall configuration of an imaging forming apparatus of the present Embodiment will be described using FIG. 1. An image forming apparatus 100 shown in FIG. 1 is a full-color printer of a tandem type and of an electrophotographic method. The image forming apparatus 100 forms a toner image on a recording material P based on image data sent from a document reading apparatus (not shown) connected to an apparatus main assembly or from an external device (not shown) such as a personal computer connected to the apparatus main assembly so as to be capable of inputting/outputting data. A recording material P is, for example, a sheet of paper, plastic film, etc.

As shown in FIG. 1, the image forming apparatus 100 is provided with image forming portions 120*a*, 120*b*, 120*c* and 120*d* which form yellow, magenta, cyan and black images, respectively.

The image forming portions 120*a*, 120*b*, 120*c* and 120*d* are arranged side by side in the apparatus main assembly along a movement direction of an intermediary transfer belt 115. The intermediary transfer belt 115 is stretched around a plurality of rollers and rotates with carrying a toner image which is primarily transferred as described below. A secondary transfer outer roller 118 is disposed in a position opposite to a secondary transfer inner roller 117, which stretches the intermediary transfer belt 115, across the intermediary transfer belt 115, and forms a secondary transfer portion T2 which transfers the toner image on the intermediary transfer belt 115 to the recording material P. The fixing unit 200 is disposed downstream of the secondary transfer portion T2 with respect to a recording material conveyance direction.

The image forming portions 120*a*, 120*b*, 120*c* and 120*d* have substantially the same configuration, except that developing colors are different. Therefore, the yellow image forming portion 120*a* will be described here as a representative, and description of the other image forming portions 120*b*, 120*c* and 120*d* will be omitted.

The image forming portion 120*a* is provided with a photosensitive drum 111. The photosensitive drum 111 is rotated counterclockwise in FIG. 1. Around the photosensitive drum 111, a charging device 112, an exposure device 113, a developing device 114, and a primary transfer roller 116 are disposed.

A process for forming a full-color image, for example, by the image forming apparatus 100 will be described. First, a surface of the rotating photosensitive drum 111 is uniformly charged by the charging device 112. The charged photosensitive drum 111 is exposed to a laser beam emitted from the exposure device 113. By this, an electrostatic latent image is formed on the surface of the photosensitive drum 111. The electrostatic latent image formed on the photosensitive drum 111 is developed into a toner image by the developing device 114 using a developer containing toner and carrier. The toner image formed on the photosensitive drum 111 is primarily transferred to the intermediary transfer belt 115 at a primary transfer portion, which is formed between the photosensitive drum 111 and the primary transfer roller 116 disposed across the intermediary transfer belt 115.

Thereafter, the recording material P accommodated in a cassette 103 is conveyed to the secondary transfer portion T2 in accordance with a timing of the formation of the toner image. Then, by applying secondary transfer voltage to the secondary transfer outer roller 118, the toner image is secondarily transferred from the intermediary transfer belt 115 to the recording material P. Incidentally, in the present embodiment, an image forming unit 110, which forms the toner image on the recording material P, is constituted by the image forming portions 120*a*, 120*b*, 120*c* and 120*d*, the intermediary transfer belt 115, the secondary transfer inner roller 117, the secondary transfer outer roller 118, etc.

The recording material P on which the toner image is formed is conveyed to the fixing unit 200. The fixing unit 200 includes a fixing belt and a pressing roller, as described below, and fixes the toner image on the recording material P by applying heat and pressure to the recording material P upon nipping and conveying the recording material P on which the toner image is formed at the fixing nip portion formed by the fixing belt and the pressing roller.

The imaging forming apparatus 100 is capable of performing a single-side printing, in which a toner image is formed on one side of the recording material P, and a double-side printing, in which the toner images are formed on both sides of the recording material P. In a case of single-side printing, the recording material P of which the toner image is fixed on a first side by the fixing unit 200 is guided to a discharge path 139 by a flapper 132 and discharged to an outside.

On the other hand, in a case of double-side printing, the recording material P of which the toner image is fixed on the first side by the fixing unit 200 is guided to a conveyance path 134 by the flapper 132 and conveyed to a reversing portion 136. In the reversing portion 136, a direction of the conveyance of the recording material P is switched to a conveyance path 137 by a flapper 133 in response to a rear end of the recording material P being detected by a reversing sensor 135. The recording material P reversed in the reversing portion 136 is conveyed along the conveyance path 137 toward the secondary transfer portion T2. And the recording material P passes through the secondary transfer portion T2 with a second side opposite to the first side, on which the toner image was formed, facing to the intermediary transfer belt 115. In the secondary transfer portion T2, the toner image formed on the intermediary transfer belt 115 is secondarily transferred to the second side of the recording material P. Thereafter, a fixing of the toner image is performed by the fixing unit 200 to the recording material P, and the recording material P on which the toner images are fixed is guided to the discharge path 139 by the flapper 132 and discharged to the outside.

The image forming apparatus 100 may be constituted by a single housing (casing), however, in a case of the present embodiment, the apparatus main assembly is constituted by a first housing 100*a*, a second housing 100*b* and a third housing 100*c*, which are formed separately, being connected. The fixing unit 200 is accommodated so as to be insertable and removable in the second housing 100*b*, which is connected to the first housing 100*a* and the third housing 100*c* so that the recording material P can be received from and handed to, respectively. In the second housing 100*b*, a jam detecting sensor 502 is provided downstream of the fixing unit 200 with respect to the recording material conveyance direction. The jam detecting sensor 502 is, for example, a photo sensor and detects the recording material P passing through the fixing unit 200.

The second housing 100*b* is provided with an opening/closing door 500, which is openable and closable, and an open/close detecting sensor 501. FIG. 9 and FIG. illustrate that the opening/closing door 500 is in an open state. When the opening/closing door 500 is in the open state, it becomes possible for the user to access to the fixing unit 200. As shown in FIG. 10, the opening/closing door 500 is made to be in the open state, and the fixing unit 200 is drawn out to a front side of the image forming apparatus (a direction of an arrow in FIG. 10). By drawing out the fixing unit 200, the fixing unit 200 can be removed from the main assembly of the image forming apparatus. To mount the fixing unit 200 to the main assembly of the image forming apparatus, the fixing unit 200 may be mounted by pushing the fixing unit 200 in a direction opposite to the arrow in FIG. 10.

The open/close detecting sensor 501 as a second detecting portion detects an opening and a closing of the opening/closing door 500. The user can open the opening/closing door 500 and draw out the fixing unit 200 from the second housing 100*b* to remove the recording material P which is retained in the fixing unit 200 or to maintain the fixing unit 200.

<Fixing Unit>

Figure 2:
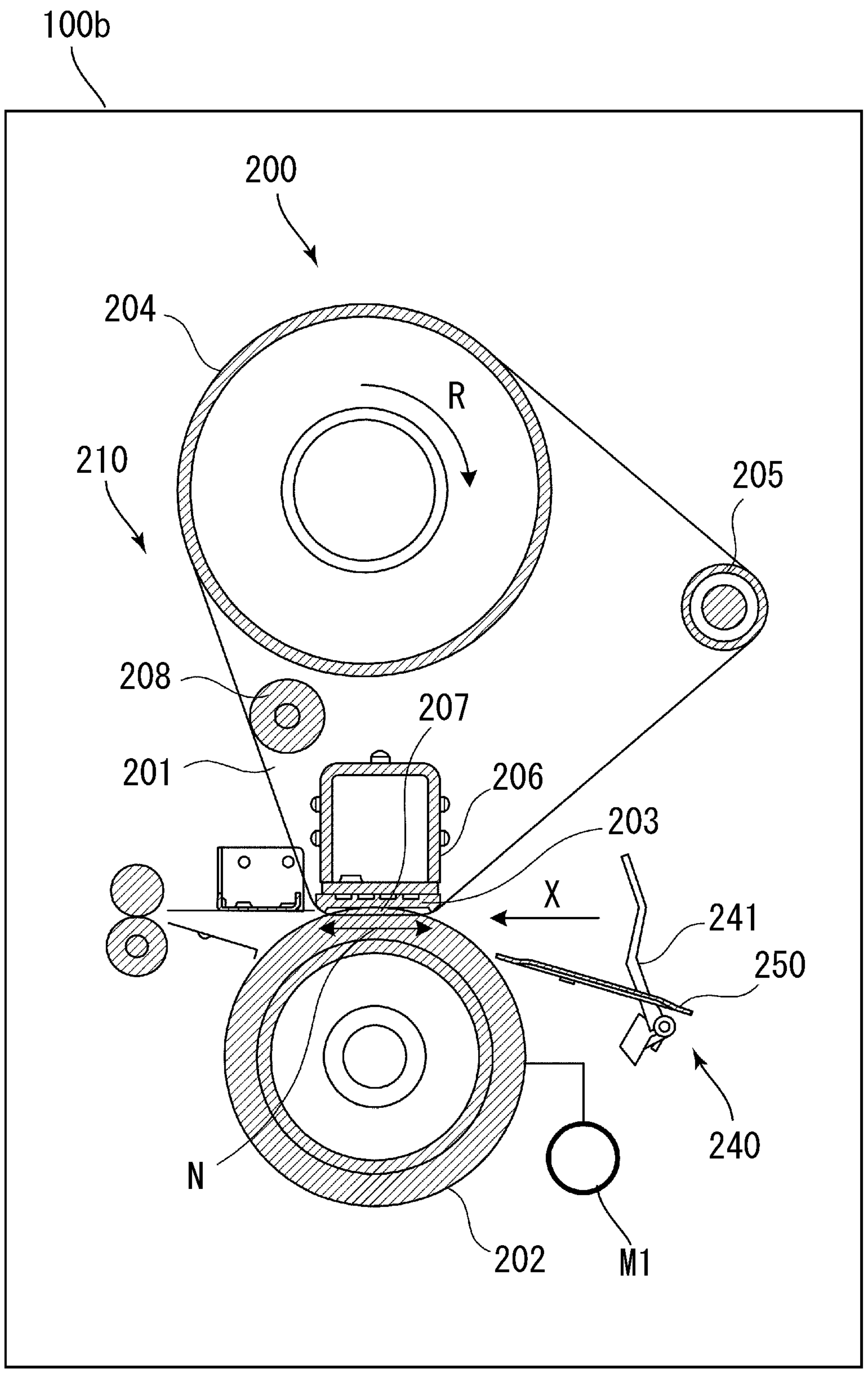
FIG. 2 is a schematic view illustrating a fixing unit.

Next, an outline of the fixing unit 200 of the present embodiment will be described using FIG. 2. In the present embodiment, the fixing unit 200 which uses an endless fixing belt and is of a belt-heating method is employed. In the present Embodiment, the fixing unit 200 includes a fixing portion 210, a pressing roller contact and separation mechanism 220 (see FIG. 3), a detecting unit 240, a conveyance guide member 250, and an interrelating mechanism 260 (see part (a) of FIG. 5). In FIG. 2, the pressing roller contact and separation mechanism 220 and the interrelating mechanism 260 are omitted for convenience of illustration.

As shown in FIG. 2, the recording material P is conveyed in a conveyance direction from right to left (a direction of an arrow X) in the fixing unit 200. Incidentally, a widthwise direction refers to a direction which intersects the conveyance direction of the recording material P in the fixing unit 200, which corresponds approximately to a direction of a rotational axis direction of a pressing roller 202 and a heating roller 204 in the present Embodiment. In addition, hereinafter, a downstream of the recording material conveyance direction in the fixing unit 200 is simply referred to as "downstream" and an upstream of the recording material conveyance direction in the fixing unit 200 is simply referred to as "upstream".

The fixing portion 210 includes an endless fixing belt 201, the pressing roller 202 as a first rotating member, a fixing pad 203, the heating roller 204, a steering roller 205, a stay 206, a sliding sheet 207 and an oil supplying roller 208.

<Fixing Belt>

The fixing belt 201 as a second rotating member has thermal conductivity and heat resistance, etc., and is formed in a thin cylindrical shape. In the present Embodiment, the fixing belt 201 has a three-layer structure including a base layer, an elastic layer formed on an outer periphery of the base layer, and a releasing layer formed on an outer periphery of the elastic layer. For example, the base layer is "60 μm" thick and made of polyimide resin (PI), the elastic layer is "300 μm" thick and made of silicone rubber, and the releasing layer is "30 μm" thick and made of polytetrafluoroethylene Perfluoroalkoxyethylene copolymer (PFA). The fixing belt 201 is stretched by the fixing pad 203, the heating roller 204 and the steering roller 205.

<Fixing Pad>

The fixing pad 203 is provided in order to form a fixing nip portion N having a predetermined width in the conveyance direction (the direction of the arrow X) by being pressed against the pressing roller 202 via the fixing belt 201. The recording material P is guided to the fixing nip portion N by the conveyance guide member 250 which is disposed upstream of the fixing nip portion N so as a leading end of the recording material P to be guided. The fixing pad 203, of which a cross-section is formed in an approximately rectangular shape, extends along the widthwise direction of the fixing belt 201. The fixing pad 203 is formed of resin having high heat resistance, such as liquid crystal polymer resin (LCP), for example.

<Stay>

In the present Embodiment, the fixing belt 201 is pressed from an inside toward the pressing roller 202 by the fixing pad 203 held by the stay 206. The stay 206 is provided non-rotatably inside the fixing belt 201. The stay 206 is a reinforcing member having high rigidity which allows to back up the fixing pad 203 and, for example, the stay 206 is made of stainless steel (SUS304) of "3 mm" thick and is long in the widthwise direction, and the cross section of the stay 206 is formed in a square hollow. By making the fixing pad 203, which is made of resin, be held by the more rigid metal stay 206, causing a reduction of flex generated in the fixing pad 203 by a pressing with the pressing roller 202, therefore, a pressing force in the fixing nip portion N is secured.

<Sliding sheet>

To improve sliding property between the fixing belt 201 and the fixing pad 203, the stay 206 holds a sliding sheet 207 which slides against the fixing belt 201. The sliding sheet 207 is disposed, in a state held by the stay 206, in a position opposite to the pressing roller 202 across the fixing belt 201. The sliding sheet 207 is formed as polytetrafluoroethylene (PTFE) is coated on a surface of a polyimide substrate of "70 μm" thick, for example. Incidentally, in order to improve the sliding property between the fixing belt 201 and the fixing pad 203, it is not limited to disposing the sliding sheet 207, but the fixing pad 203 of which a surface is treated by a coating which improves the sliding property may be used.

<Heating Roller>

The heating roller 204 is disposed inside the fixing belt 201 and stretches the fixing belt 201 together with the stay 206 and the steering roller 205. The heating roller 204 is, for example, made of stainless steel having "1 mm" thick and formed in a pipe-shaped, and inside of which a halogen heater is provided. The heating roller 204 is heated to a predetermined temperature by the halogen heater.

The fixing belt 201 is heated by the heating roller 204 to a predetermined target temperature according to a type of the recording material P based on a temperature detection by an unshown thermistor.

<Steering Roller>

The steering roller 205 is provided to control a position of the fixing belt 201 in the widthwise direction. The steering roller 205 is supported by an unshown steering frame and stretches the fixing belt 201. The steering roller 205 changes its alignment with the heating roller 204 by rotating with respect to the heating roller 204 about a rotational shaft provided in the steering frame as a fulcrum. By this, the heating roller 204 swings and the fixing belt 201 moves in the widthwise direction since a tension difference is generated between one end side and the other end side of the fixing belt 201 in the widthwise direction.

<Oil Supplying Roller>

The oil supplying roller 208 is a roll-shaped member wound with a nonwoven fabric of "100 μm" thick, for example, and in the nonwoven fabric, silicone oil is impregnated. The oil supplying roller 208 is made to be in contact with an inner peripheral surface of the fixing belt 201 by an unshown spring and is driven and rotated by the fixing belt 201. The oil supplying roller 208 supplies the silicone oil to the inner peripheral surface of the fixing belt 201. The silicone oil supplied to the inner peripheral surface of the fixing belt 201 is supplied as a lubricant between the fixing belt 201 and the fixing pad 203 as the fixing belt 201 rotates.

<Pressing Roller>

The pressing roller 202 is rotatably supported on a frame (not shown) of the fixing unit 200. A gear is fixed to one end of the pressing roller 202 with respect to the widthwise direction, and the pressing roller 202 is rotated by a motor M1 connected via the gear. When the pressing roller 202 rotates, rotational force of the pressing roller 202 is transmitted to the fixing belt 201 by frictional force generated in the fixing nip portion N. Thus, the fixing belt 201 is driven and rotated by the pressing roller 202. The pressing roller 202 is constituted by an elastic layer formed on an outer periphery of a rotational shaft and a releasing layer formed on an outer periphery of the elastic layer. For example, the rotating shaft is made of stainless steel, the elastic layer is made of conductive silicone rubber of "5 mm" thick, and the release layer is made of perfluoroalkoxyalkane (PFA) of "50 μm" thick.

<Pressing Roller Contact and Separation Mechanism>

In the present Embodiment, the pressing roller 202 is configured to be movable between the contact position, in which the pressing roller 202 is in contact with the fixing belt 201, and to the separated position, in which the pressing roller 202 is separated from the fixing belt 201. Then, the pressing roller contact and separation mechanism 220 which moves the pressing roller 202 to the contact position and the separated position will be described using from FIG. 3 through part (b) of FIG. 4 with reference to FIG. 2.

Figure 3:
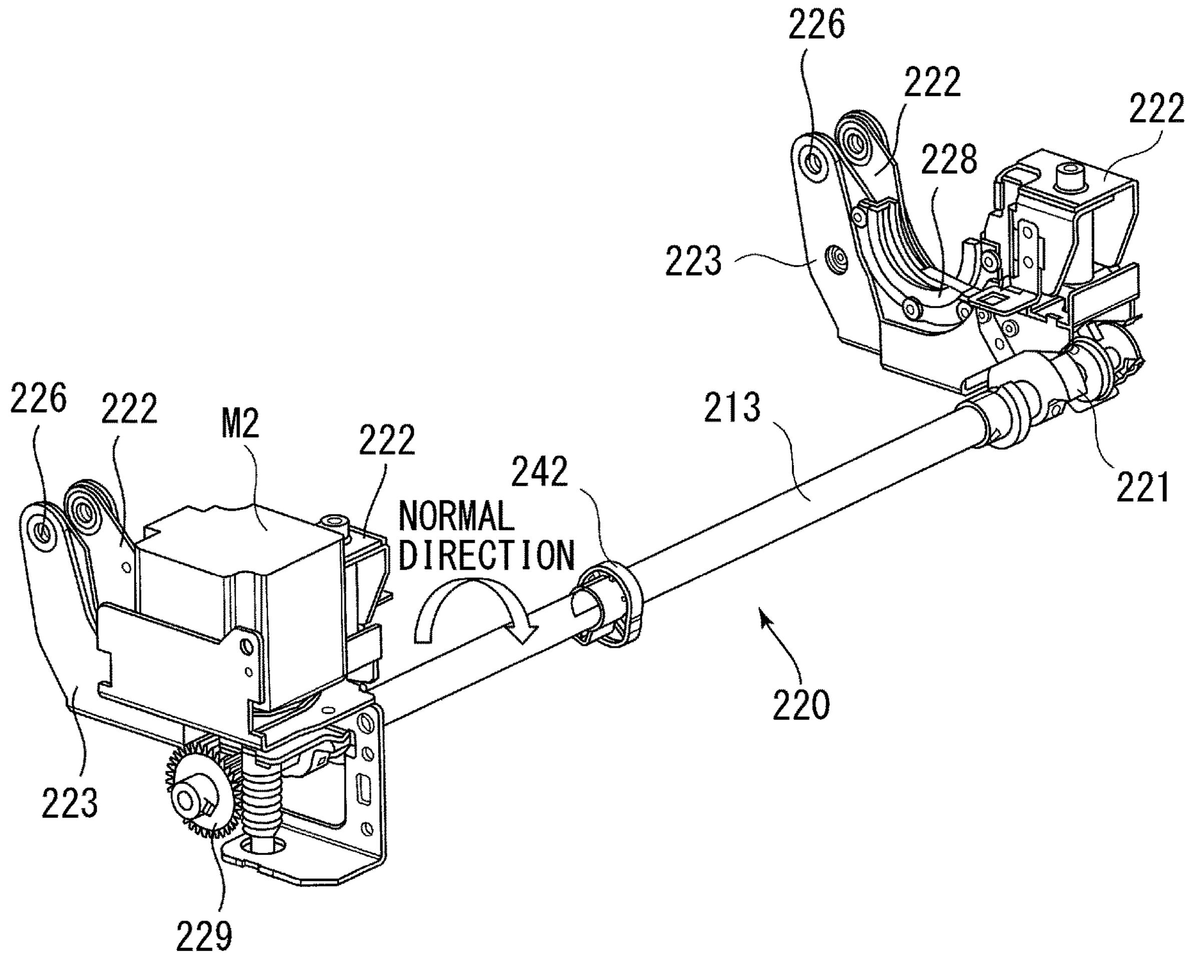
FIG. 3 is a perspective view illustrating a pressing roller contact and separation mechanism.

As shown in FIG. 3, the pressing roller contact and separation mechanism 220 includes a rotational shaft 213, a pressing cam 221, a pressing upper arm 222, a pressing lower arm 223, a pressing spring 224 (see FIG. 4), and a pressing cam follower 225 (see FIG. 4). The pressing cam 221, the pressing upper arm 222, the pressing lower arm 223, the pressing spring 224 and the pressing cam follower 225 are disposed at both end portions of the rotational shaft 213.

A motor M2 is connected to one end side of the rotational shaft 213 via a gear train 229. The motor M2 as a drive portion rotates and drives the rotational shaft 213 to drive the pressing roller contact and separation mechanism 220. In the present Embodiment, in FIG. 3, when the rotational shaft 213 is rotated in a forward rotational direction (clockwise), the pressing roller 202 is moved by the pressing roller contact and separation mechanism 220 to the separated position, away from the fixing belt 201. Conversely, when the rotational shaft 213 is rotated in a reverse rotational direction (counterclockwise), the pressing roller 202 is moved by the pressing roller contact and separation mechanism 220 to the contact position, in which the pressing roller 202 is in contact with the fixing belt 201. Incidentally, in the present Embodiment, a worm gear is used for the gear train 229, however, it is not limited to this configuration but a spur gear, a helical gear, etc., may be used for the gear train 229.

As shown in part (a) of FIG. 4, the pressing upper arm 222 and the pressing lower arm 223 are attached to the frame (not shown) of the fixing unit 200 rotatably about a rotational shaft 227, which is connected to a rotational hole 226. To the pressing upper arm 222, a supporting holder 228 which supports a bearing 202*a* of the pressing roller 202 is provided. To the pressing lower arm 223, a pressing cam follower 225 is provided. In addition, to the pressing upper arm 222 and the pressing lower arm 223, the pressing spring 224 which connects the pressing upper arm 222 and the pressing lower arm 223 is provided on an opposite side of the rotational shaft 227 across the pressing roller 202.

In the present Embodiment, when the rotational shaft 213 is rotated in the reverse rotational direction (counterclockwise in FIG. 3), the pressing roller 202 moves in a direction approaching to the fixing belt 201. Conversely, when the rotational shaft 213 is rotated in the forward rotational direction (clockwise in FIG. 3), the pressing roller 202 moves in a direction separating from the fixing belt 201. In order to realize this, the pressing cam 221 is provided on the rotational shaft 213. The pressing cam 221 rotates according to the rotation of the rotational shaft 213.

The pressing cam 221 as a first cam portion includes a bottom dead point area 221*a* and a top dead point area 221*b*, and when the bottom dead point area 221*a* is in contact with the pressing cam follower 225, the pressing roller 202 is in a state separated from the fixing belt 201 as shown in part (b) of FIG. 4. On the other hand, when the top dead point area 221*b* is in contact with the pressing cam follower 225, the pressing roller 202 is in a state in contact with the fixing belt 201 as shown in part (a) of FIG. 4. Incidentally, when the pressing roller 202 is in the state in contact with the fixing belt 201, the pressing roller 202 receives pressing force from the pressing spring 224 to the fixing belt 201.

As shown in FIG. 2, in the present Embodiment, the conveyance guide member 250 and the detecting unit 240 are provided upstream of the fixing nip portion N. The conveyance guide member 250 is provided to guide the recording material P which has passed through the secondary transfer portion T2 (see FIG. 1) to the fixing nip portion N. The detecting unit 240 is provided to detect the retaining of the recording material P in the fixing nip portion N. Incidentally, the conveyance guide member 250 may be provided downstream of the fixing nip portion N to guide the recording material P which has passed through the fixing nip portion N to the conveyance path 134 or to the discharge path 139 (see FIG. 1). In this case, the detecting unit 240 is disposed downstream of the fixing nip portion N.

<Detecting Unit>

Next, the detecting unit 240 and the interrelating mechanism 260 will be described using part (a) and part (b) of FIG. 5(*a*) with reference to FIG. 2 and FIG. 3. As shown in part (a) and part (b) of FIG. 5, the detecting unit 240 includes a detecting lever 241 as a detecting member and a lever detecting sensor 247 as a first detecting portion.

The detecting lever 241 is provided rotatably on the conveyance guide member 250 with a rotation center hole 241*a* as a rotational center, and the lever detecting sensor 247 is fixed to the conveyance guide member 250. The detecting lever 241 is pressed clockwise (in a direction of an arrow C) in part (a) of FIG. 5 by an unshown lever urging spring.

The lever detecting sensor 247 is a photo interrupter which is capable of detecting a position of the detecting lever 241 by arranging a light emitting element and a light receiving element opposite to each other, with a light blocking portion 241*c* of the detecting lever 241 blocking the light between the light emitting element and the light receiving element. In the present Embodiment, when the detecting lever 241 is in the detecting position, the lever detecting sensor 247 is not blocked by the light blocking portion 241*c*. On the other hand, when the detecting lever 241 is in the retracted position, the lever detecting sensor 247 is blocked by the light blocking portion 241*c*.

The detecting position of the detecting lever 241 refers to a position in which a part of the detecting lever 241 protrudes from a conveyance surface 250*f* of the conveyance guide member 250, as shown in part (a) of FIG. 5. The retracted position of the detecting lever 241 refers to a position in which the detecting lever 241 is not protruding from the conveyance surface 250*f* of the conveyance guide member 250, as shown in part (b) of FIG. 5. In the retracted position, the detecting lever 241 is accommodated in the conveyance guide member 250.

In a case in which the recording material P is retained in the fixing nip portion N during an image formation, the detecting lever 241 in the detecting position moves in a direction from a front surface side to a back surface side of the recording material P by being pressed by the recording material P retained on the conveyance surface 250*f*. In other words, when the detecting lever 241 is moved by being pressed by the recording material P and the lever detecting sensor 247 is blocked, it is detected that the recording material P is retained in the fixing nip portion N by a control portion 150 described below.

In the present Embodiment, the detecting lever 241 is configured to be moved to the detecting position and the retracted position by the interrelating mechanism 260, in addition to being pressed by the recording material P retained on the conveyance surface 250*f* as described above. As shown in Table 1, when the pressing roller 202 is moved from the separated position to the contact position, the detecting lever 241 is moved from the detecting position to the retracted position (from state B to state C) by the interrelating mechanism 260. This is because when the detecting lever 241 is in the detecting position during the image formation, the detecting lever 241 gets in a way of the recording material P being conveyed. On the other hand, when the pressing roller 202 is moved from the contact position to the separated position, the detecting lever 241 is moved from the retracted position to the detecting position by the interrelating mechanism 260 (from state C to state B). This is because in order to make it possible to detect that the recording material P is retained in the fixing nip portion N by the detecting lever 241, as described above.

Furthermore, in the present Embodiment, when the pressing roller 202 is in the separated position, the detecting lever 241 may be moved by the interrelating mechanism 260 to the retracted position and the detecting position (state B and state A), while keeping the pressing roller 202 in the separated position. As shown in Table 1, combinations of the positions of the pressing roller 202 and the detecting lever 241 are a state A, a state B and a state C. A positional control of the detecting lever 241 will be described below.

TABLE 1

| | State A | State B | State C |
|---|---|---|---|
| Pressing roller | Separated position | Separated position | Contact position |
| Detecting lever | Retracted position | Detecting position | Retracted position |

<Interrelating Mechanism>

Next, the interrelating mechanism 260, which causes the detecting lever 241 to move between the detection position and the retracted position, will be described. As shown in part (a) and part (b) of FIG. 5, the interrelating mechanism 260 includes a switching cam 242, a first link 243, and a second link 244.

The switching cam 242 as a second cam portion is provided on the rotational shaft 213, on which the pressing cam 221 is provided, and is rotated with the rotational shaft 213 by the motor M2 (see FIG. 3). The first link 243 and the second link 244 are each provided rotatably on the frame of the fixing unit 200 (not shown). The first link 243 is urged counterclockwise by an unshown first urging spring, and the second link 244 is urged clockwise by an unshown second urging spring.

The switching cam 242 includes a bottom dead point area 242*a* and a top dead point area 242*b* on a cam surface.

As shown in part (a) of FIG. 5, when the top dead point area 242*b* of the switching cam 242 is in contact with the first link 243, the first link 243 presses the second link 244 in a state being rotated clockwise against urging force of the first urging spring. When the second link 244 is pressed by the first link 243, the second link 244 is rotated counterclockwise against urging force of the second urging spring and is separated from the detecting lever 241. When the detecting lever 241 is not in contact with the second link 244, the detecting lever 241 is rotated clockwise by an unshown lever urging spring. Thus, the detecting lever 241 moves to the detecting position and is kept in the detecting position by the unshown lever urging spring.

On the other hand, as shown in part (b) of FIG. 5, when the bottom dead point area 242*a* of the switching cam 242 is in contact with the first link 243, the first link 243 does not press the second link 244. When the second link 244 is not pressed by the first link 243, the second link 244 rotates clockwise by the urging force of the second urging spring and is in contact with the detecting lever 241. The detecting lever 241 is then pressed by the second link 244 and is rotated counterclockwise against the urging force by the unshown lever urging spring.

Thus, the detecting lever 241 is moved to the retracted position and kept in the retracted position by the second link 244.

In the present Embodiment, as shown in FIG. 3, the switching cam 242 of the interrelating mechanism 260 is disposed in a central portion of the rotational shaft 213, on which the pressing cam 221 is provided. Therefore, the detecting lever 241 is moved from the retracted position to the detecting position interrelated with a movement of the pressing roller 202 from the contact position to the separated position. In addition, the detecting lever 241 is also moved from the detecting position to the retracted position interrelated with a movement of the pressing roller 202 from the separated position to the contact position.

In addition, in the present Embodiment, when the pressing roller 202 is in the separated position, the detecting lever 241 is moved between the retracted position and the detecting position by the interrelating mechanism 260 while keeping the pressing roller 202 in the separated position. In order to realize this, the bottom dead point area 221*a* and the top dead point area 221*b* of the pressing cam 221 and the bottom dead point area 242*a* and top dead point area 242*b* of the switching cam 242 are formed. In other words, a relationship between a phase of a cam surface of the pressing cam 221 and a phase of the cam surface of the switching cam 242 allows the detecting lever 241 to move between the detecting position and the retracted position while keeping the pressing roller 202 in the separated position.

<Control Portion>

As shown in FIG. 1, the image forming apparatus 100 is provided with the control portion 150. The control portion 150 will be described here mainly with reference to a control system for removing the recording material P retained in the fixing nip portion N (referred to as a fixing jam), using FIG. 6 with reference from FIG. 1 through FIG. 3. Incidentally, in addition to those shown in FIG. 6, various devices such as various portions which constitute the image forming apparatus 100 and driving sources (motors, power supplies, etc.) for operating the various portions are connected to the control portion 150. However, since these are not related to a main purpose of the present invention here, illustrations and description for these are omitted.

The control portion 150 controls various operations related to the image formation and is constituted by, for example, a CPU 151 (Central Processing Unit), a ROM 152 (Read Only Memory), a RAM 153 (Random Access Memory), etc. The CPU 151 controls the image forming apparatus 100 by executing various control programs stored in the ROM 152 and the RAM 153. The ROM 152 and the RAM 153 store various control programs such as an image forming process (not shown) and a "detecting lever control process" (see FIG. 7 which will be described below), and various data such as the image data for forming the toner image. Incidentally, the RAM 153 may also temporarily store results of arithmetic processes associated with the execution of various programs, etc.

An operating portion 180 is connected to the control portion 150. The operating portion 180 is provided with a display portion such as an LCD panel, which displays information to the user and, an input device such as physical keys or a touch panel function portion of the LCD panel, which allows the user to input an instruction and data to the control portion 150. The control portion 150 receives the instruction of the execution of an image forming job when the instruction of the execution of the image forming job, etc., is input according to an operation of the operating portion 180 by the user.

In addition, the motor M2, the lever detecting sensor 247, the open/close detecting sensor 501, the jam detecting sensor 502, etc., are also connected to the control portion 150. The control portion 150 receives a detection signal from the jam detecting sensor 502 and determines whether or not the recording material P is retained in the middle of the conveyance path in the image forming apparatus 100 during the image formation, that is, whether or not a jam of the recording material P has occurred, based on the detection signal. In a case in which the jam of the recording material P has occurred, the control portion 150 determines whether or not the fixing jam occurs based on a detection result of the lever detecting sensor 247. In the case in which the fixing jam occurs, the control portion 150 displays on an LCD screen of the operating portion 180 that the jam of the recording material P has occurred in the fixing nip portion N. The control portion 150 detects whether the opening/closing door 500 is open or closed based on a detection signal from the open/close detecting sensor 501. And the control portion 150 controls the motor M2 to move the pressing roller 202 between the contact position and the separated position by the pressing roller contact and separation mechanism 220, and to move the detecting lever 241 between the detecting position and the retracted position by the interrelating mechanism 260.

<Detecting Lever Control Process>

Next, the "detecting lever control process", which performs the positional control of the detecting lever 241 in the case of the fixing jam, will be described using FIG. 7 and FIG. 8. The "detecting lever control process" is initiated by the control portion 150 upon turning on of the image forming apparatus 100. Incidentally, when the image forming apparatus 100 is turned on, the pressing roller 202 is in the separated position and the detecting lever 241 is in the detecting position (state B of FIG. 8). The phase of the rotational shaft 213 here is defined as the phase "0" as shown in FIG. 8. Incidentally, in FIG. 8, the reverse rotational direction of the rotational shaft 213 is described as an "R direction".

As shown in FIG. 7, the control portion 150 determines whether or not the jam of the recording material P has occurred based on the detection signal of the jam detecting sensor 502 (S1). Generally, when the image forming apparatus 100 is turned on, no jam occurs in an initial state. Therefore, it is determined that no jam has occurred in the initial state ("NO" in S1), and the control portion 150 shifts the image forming apparatus 100 from the initial state to a standby state (S7). Until receiving the image forming job (S8), the control portion 150 keeps the image forming apparatus 100 waiting in the "standby state", in which an image forming operation onto the recording material P can be started in response to an input of the image forming job.

When the control portion 150 receives the image forming job, the control portion 150 controls the motor M2 to operate the pressing roller 202 and the detecting lever 214 to shift from the "state B" to the "state C" (S9). In this case, the control portion 150 rotates the motor M2 reversely to set the phase of the rotational shaft 213 to, for example, equal to or more than "40" and equal to or less than "60" as shown in FIG. 8. As a result, the pressing roller 202 is moved from the separated position to the contact position, and the detecting lever 214 is moved from the detecting position to the retracted position. And, when in the "state C", the image forming apparatus 100 performs the image formation onto the recording material P.

The control portion 150 determines whether or not to terminate the image forming job (S10). For example, when the image formations for a number of the recording materials P input from the operating portion 180 are completed, the control portion 150 determines to terminate the image forming job ("YES" in S10) and controls the motor M2 to operate the pressing roller 202 and the detecting lever 214 to shift from the "state C" to "state B" (S11). In this case, the control portion 150 rotates the motor M2 forward to return the phase of the rotational shaft 213 to "0" as shown in FIG. 8. As a result, the pressing roller 202 is moved from the contact position to the separated position, and the detecting lever 214 is moved from the retracted position to the detecting position. On the other hand, if the image forming job is not terminated ("NO" in S10), the control portion 150 returns to the process of the step S1. In this case, the image formation is continued to be in the "state C". Thus, as long as no jam of the recording material P occurs during the image formation, the state shifts between the "state B" and the "state C", but not to the "state A".

In the case of the jam occurs in the middle of the conveyance path during the image formation ("YES" in S1), the control portion 150 stops the image forming job being executed temporarily and then controls the motor M2 to operate the pressing roller 202 and detecting lever 214 to shift from the "state C" to the "state B" (S2). That is, the control portion 150 rotates the motor M2 forward to return the phase of the rotational shaft 213 to "0". Thereafter, the control portion 150 determines whether or not the jam (fixing jam) of the recording material P has occurred in the fixing nip portion N based on a detection signal of the lever detecting sensor 247 (S3). If no fixing jam has occurred ("NO" in S3), the control portion 150 executes a control to suggest the user perform an operation to remove a jam which occurred in other than the fixing nip portion N, although an illustration in FIG. 7 is omitted here. After the removal of the jam, the control portion 150 keeps the image forming apparatus 100 waiting in the "standby state" until a job resumption is instructed (S7).

If the jam which has occurred during the image formation is the fixing jam ("YES" in S3), the control portion 150 informs the user by displaying on the LCD panel of the operating portion 180, etc., that the fixing jam has occurred (S4). In order to remove the fixing jam, it is necessary for the user to open the opening/closing door 500 to access the fixing unit 200. Therefore, the control portion 150 waits until detecting that the opening/closing door 500 is opened based on the detection signal of the open/close detecting sensor 501 (S5). The control portion 150 also controls the motor M2 to operate only the detecting lever 214 while keeping the pressing roller 202 in the separated position to shift from the "state B" to the "state A" (S6). In this case, the control portion 150 rotates the motor M2 forward to set the phase of the rotational shaft 213 from "0" to, for example, equal to or more than "−50" and equal to or less than "−20" as shown in FIG. 8. The control portion 150 then returns to the process of the step S3.

Thus, in the case of the present Embodiment, a condition for shifting from the "state B" to the "state A" is when the fixing jam occurs and the user opens the opening/closing door 500 to remove the fixing jam by drawing out the fixing unit 200. That is, when the user attempts to remove the recording material P retained in the fixing nip portion N, if the detecting lever 241 remains in the detecting position, the detecting lever 241 may be damaged by catching the recording material P, especially in a case of a thick paper, on the detecting lever 241 or by an unintentional hand contact. Therefore, when the user opens the opening/closing door 500 in the case of the fixing jam occurs, it becomes possible to prevent the detecting lever 241 from being damaged by rotating the rotational shaft 213 to move the detecting lever 241 from the detecting position to the retracted position.

As shown in FIG. 10, when the fixing unit 200 is removed from the imaging forming apparatus 100, the detecting lever 241 of the detecting unit 240 is positioned in the retracted position.

Incidentally, in a case in which the opening/closing door 500 is opened for maintenance of the fixing unit 200, for example, when it is in the "state B" before an image forming job is input, the rotational shaft 213 may also be rotated to move the detecting lever 241 from the detecting position to the retracted position.

As described above, in the present Embodiment, the detecting lever 241 can be moved to the detection position and the retracted position when the pressing roller 202 is in the separated position. By this, it becomes possible to prevent the damage of the detecting lever 241 during the removal of the fixing jam and the maintenance of the fixing unit 200, since the detecting lever 241 is moved to the retracted position where the recording material P to be removed or the user's hand will not hit.

Other Embodiments

Incidentally, the embodiment described above describes the configuration in which the detecting lever 241 is operated by the interrelating mechanism 260, however, it is not limited to this configuration. For example, the detecting lever 241 may be configured to be operated by a motion mechanism provided with a link portion and a solenoid, according to a control of the solenoid by the control portion 150. In other words, the movement of the pressing roller 202 and the movement of the detecting lever 241 may be performed by independent drive sources and mechanisms, respectively.

If the movement of the pressing roller 202 and the movement of the detecting lever 241 described above are performed by the independent drive sources and mechanisms, respectively, then the movement of the detecting lever 241 need not to be configured to be moved based on the detection signal of the open/close detecting sensor 501. For example, it may be configured when the opening/closing door 500 becomes the open state from the closed state with respect to the apparatus main assembly, the detecting lever 241 is moved from the detecting position to the retracted position interrelated with the movement of the door 500. In other words, it may be configured that the switching cam 242 may be rotated and then the detecting lever is moved interrelated with the opening/closing door 500 becoming the open state from the closed state. In this configuration, the detecting lever 241 may be moved to the retracted position without using the detection signal.

Yet another configuration is that the detecting lever 241 is moved from the detecting position to the retracted position when the fixing unit 200 is withdrawn from the apparatus main assembly. The configuration is that the switching cam 242 rotates interrelated with the withdrawal operation of the fixing unit 200. Therefore, a trigger for moving the detecting lever 241 to the retracted position is not limited to the opening/closing door. The configuration should be such that the detecting lever 241 is moved to the retracted position when the fixing unit 200 is drawn out from the apparatus main assembly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2022-174159 filed on Oct. 31, 2022 and 2023-124693 filed on Jul. 31, 2023, which are hereby incorporated by reference herein in their entirety.

What is claimed is:

1. An image forming apparatus comprising:

an image forming portion configured to form a toner image on a recording material;

a fixing device detachably mounted on a main assembly of the image forming apparatus and configured to fix the toner image formed on the recording material by the image forming portion;

wherein the fixing device includes a heating rotatable member configured to heat the toner image on the recording material, a pressing rotatable member configured to form a nip portion by being in contact with the heating rotational member, and a detecting unit disposed upstream of the nip portion with respect to a conveyance direction of the recording material and configured to detect the recording material, and wherein when a surface of the recording material on which the toner image is formed by the image forming apparatus is defined as a front surface and a surface opposite to the front surface is defined as a back surface, the detecting unit includes a detecting flag, which is provided to be movable and capable of contacting the back surface of the recording material, the image forming apparatus further comprising:

a moving mechanism including a cam and configured to cause the detecting flag and the pressing rotatable member to move, wherein the moving mechanism is configured to cause the detecting flag to move between a first position located in a conveyance path of the recording material and a second position retracted from the first position by rotating the cam, and configured to be capable of changing the state between a contact state in which the pressing rotatable member is in contact with the heating rotatable member, and a separation state in which the pressing rotatable member is spaced apart from the heating rotatable member by rotating the cam, wherein when the cam is positioned in a first cam position, the detecting flag is in the second position and the pressing rotatable member is in the contact state, wherein when the cam is positioned in a second cam position, the detecting flag is in the first position and the pressing rotatable member is in the separation state, and wherein when the cam is positioned in a third cam position, the detecting flag is in the second position and the pressing rotatable member is in the separation state.

2. An image forming apparatus according to claim 1, further comprising a control portion configured to control the moving mechanism, wherein the control portion controls the moving mechanism to cause the cam to position in the second cam position when the fixing device is positioned in a mounting position in a state in which an image forming operation is stopped, and to cause the cam to position in the third cam position when the fixing device is demounted.

3. An image forming apparatus according to claim 1, further comprising a control portion configured to control the moving mechanism, wherein the control portion controls the moving mechanism to cause the cam to de positioned in the first cam position, at least during a period after a leading end of the recording material passes through the detecting unit until a trailing end of the recording material passes through the detecting unit, and wherein the control portion controls the moving mechanism to cause the cam to be positioned in the second cam position in a state in which the fixing device is mounted on the main assembly of the image forming apparatus, after the trailing end of the last recording material in an image forming job passes through the detecting unit, and wherein the control portion controls the moving mechanism to cause the cam to be positioned in the third cam position in a state in which the fixing device is demounted from the main assembly of the image forming apparatus.

4. An image forming apparatus according to claim 3, wherein the control portion controls the moving mechanism to cause the cam to be positioned in the second cam position when an error due to a jamming of the recording material occurs in the image forming apparatus.

5. An image forming apparatus according to claim 1, wherein the detecting unit includes a rotational shaft which is a rotational center of the detecting flag and is movable between the first position and the second position by being rotated about the rotational shaft.

6. An image forming apparatus according to claim 5, further comprising a guide member configured to guide the recording material to upstream of the nip portion with respect to the conveyance direction of the recording material, wherein the rotational shaft is positioned downward of the guide member with respect to a vertical direction.

7. An image forming apparatus according to claim 1, further comprising a door provided on the main assembly of the image forming apparatus so as to be openable and closable, wherein the fixing device is capable of being demounted from the main assembly of the image forming apparatus in a state in which the door is opened.

8. An image forming apparatus according to claim 7, further comprising a control portion, and a detecting portion configured to detect an opening and a closing of the door, wherein the control portion controls the moving mechanism to cause the cam to be positioned in the third cam position when the detecting portion detects the opening of the door.

9. An image forming apparatus according to claim 1, wherein the moving mechanism causes the detecting flag to move from the first position to the retracted second position in interrelation with a demounting operation of the fixing device from the main assembly of the image forming apparatus.

10. An image forming apparatus according to claim 1, further comprising a door provided on the main assembly of the image forming apparatus so as to be openable and closable, wherein the moving mechanism causes the detecting flag to move from the first position to the retracted second position in interrelation with an opening operation of the door from a closing state of the door to the main assembly of the image forming apparatus.

11. An image forming apparatus according to claim 1, the cam including a first cam portion configured to cause the detecting flag to move and a second cam portion configured to change a state between the pressing rotatable member and the heating rotatable member, and a common rotating shaft configured to hold the first cam portion and the second cam portion integrally and to rotate.

12. An image forming apparatus according to claim 1, further comprising a control portion, wherein the control portion controls the moving mechanism to cause the cam to move from the first cam position to the second cam position by rotating the cam in a first direction, and wherein the control portion controls the moving mechanism to cause the cam to move from the second cam position to the third cam position by rotating the cam in a second direction.

* * * * *